United States Patent [19]

Satoh

[11] Patent Number: 4,727,791
[45] Date of Patent: Mar. 1, 1988

[54] APPARATUS FOR CONTROLLING A HYDRAULIC SINGLE ACTING CYLINDER

[75] Inventor: Yuji Satoh, Higashi-Matsuyama, Japan

[73] Assignee: Diesel Kiki Co., Ltd., Tokyo, Japan

[21] Appl. No.: 882,531

[22] Filed: Jul. 7, 1986

[30] Foreign Application Priority Data

Jul. 10, 1985 [JP] Japan .............. 60-104944[U]

[51] Int. Cl.⁴ .............................. F15B 13/02
[52] U.S. Cl. ..................... 91/47; 91/363 R; 91/459
[58] Field of Search ............. 91/47, 363 R, 361, 459

[56] References Cited

U.S. PATENT DOCUMENTS

| 3,295,421 | 1/1967 | McCormicle | 91/363 R |
| 3,763,744 | 10/1973 | Fournell et al. | 91/363 R |
| 3,802,318 | 4/1974 | Sibbald | 91/363 R |
| 4,136,600 | 1/1979 | Heiser | 91/363 R |
| 4,579,042 | 4/1986 | Neff | 91/459 |
| 4,585,205 | 4/1986 | Coppola et al. | 91/363 R |

FOREIGN PATENT DOCUMENTS 56-42772 4/1981 Japan.
58-146722 9/1983 Japan.

Primary Examiner—A. Michael Chambers
Attorney, Agent, or Firm—Wenderoth, Lind & Ponack

[57] ABSTRACT

An apparatus for controlling a hydraulic single acting cylinder has first and second solenoid operated valves disposed in a supply line through which a working fluid is supplied to a working chamber defined in the cylinder which a piston is disposed, a third solenoid operated valve disposed in a return line through which the working fluid returns from the working chamber to a hydraulic tank, and a control unit for controlling the first to third solenoid operated valves. The second and third solenoid operated valves are solenoid operated proportional pressure control valves so that the piston speed can be regulated.

4 Claims, 4 Drawing Figures

APPARATUS FOR CONTROLLING A HYDRAULIC SINGLE ACTING CYLINDER

BACKGROUND OF THE INVENTION

1. Field of the Invention

The present invention relates generally to a hydraulic cylinder controlling apparatus, and more particularly to an apparatus for controlling a hydraulic single acting cylinder having a piston subjected to a continual unidirectional external force. The controlling apparatus is used for the control of automobile clutches, for example.

2. Description of the Related Art

There have recently been proposed various apparatuses for effecting an automatic gear shaft in a conventional automobile power transmission of the type having a clutch and a transmission gear unit so as to reduce loads on a driver as well as to provide improved mileage. In this instance, it is necessary to automatically control the clutch operations when the clutch is in a partly engaged or half-clutched condition. Japanese Patent Laid-open Publication No. 58-146722 discloses an apparatus for controlling a hydraulic single acting cylinder connected with the clutch for actuating the latter. The disclosed apparatus includes three solenoid operated directional control valves disposed in a hydraulic supply line or passage and a hydraulic return line or passage and controlled in response to the output from a control unit.

Since these solenoid operated valves comprise directional control valves having two ports and two distinct positions of the conventional type and having no means for controlling the hydraulic pressure, the cylinder piston reciprocates at a fixed speed. As a result, a great shock is generated when stopping the piston at a desired position and sometimes it becomes difficult to stop the cylinder accurately at the desired position due to overshooting caused by delayed response of the solenoid operated valves.

SUMMARY OF THE INVENTION

It is accordingly an object of the present invention to provide a controlling apparatus associated with a hydraulic single acting cylinder for regulating the reciprocating speed of a cylinder piston so as to enable the piston to stop accurately at a desired position without generating an objectionable shock.

Another object of the present invention is to provide a cylinder controlling apparatus capable of reciprocating a cylinder piston within a predetermined part of its entire stroke so as to prevent a clutch from being maintained in a partly engaged or half-clutched condition for a long period of time, thereby extending the useful life of the clutch.

According to the present invention, the foregoing and other objects are attained by an apparatus for controlling a hydraulic cylinder which comprises a first solenoid operated valve disposed in a supply line through which a working fluid is supplied from a hydraulic pressure source to a working chamber defined in the hydraulic cylinder by a piston thereof, the first solenoid operated valve being operative to open and close the supply line; a second solenoid operated valve disposed in the supply line to control the fluid pressure in the supply line; a third solenoid operated valve disposed in a return line through which the working fluid is returned from the working chamber to a hydraulic tank, said third solenoid operated valve being operative to control the fluid pressure in the return line; and a control unit for controlling the first, second and third solenoid operated valves, the second and third solenoid operated valves comprising solenoid operated proportional pressure control valves.

With this construction, the solenoid operated valves are the same in number as those of the conventional apparatus but two of those valves comprise proportional pressure control valves with the result that the hydraulic pressure in the working chamber and hence the piston speed can be regulated by these two valves controlled in response to the output from the control unit.

Many other advantages, features and other objects of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

Figure 1:
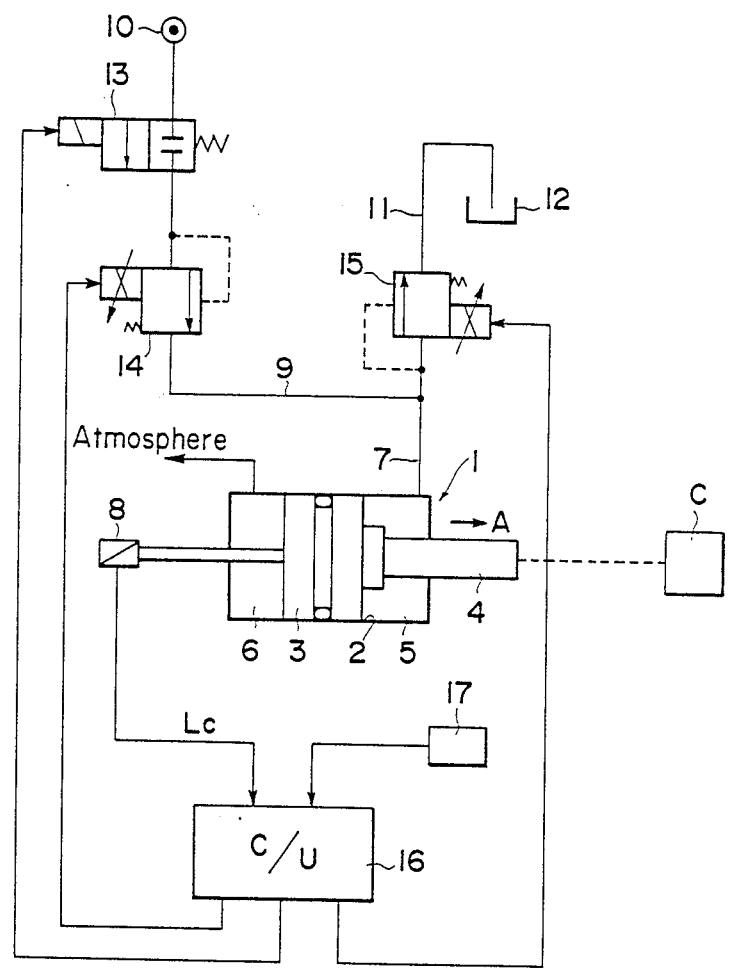
FIG. 1 is a schematic circuit diagram of a controlling apparatus embodying the present invention.

As shown in FIG. 1, an apparatus embodying the present invention is used for controlling a hydraulic single acting cylinder 1 adapted to actuate a clutch C incorporated in, for example, an automobile power transmission. The cylinder 1 includes a piston 3 slidably received in a cylinder bore 2, and a piston rod 4 integral with and extending from the piston 3. The piston rod 4 projects from one end of the cylinder 1 and is connected at its outer end with the clutch C. The piston rod 4 and hence the piston 3 is always subjected to an external force F applied in the direction of the arrow A by means of a return spring (not shown) in the clutch C. The cylinder bore 2 includes a working chamber 5 defined on a piston-rod side of the piston 3 and an atmosheric pressure chamber 6 defined on the opposite side. The working chamber 5 is connected with one end of a hydraulic supply and return passage or line 7 while the atmospheric pressure chamber 6 is open to the atmosphere. A position detector 8 is connected with the cylinder 1 to detect the position of the piston 3.

A hydraulic supply passage or line 9 is connected at one end thereof to a hydraulic pressure source 10 and at the other end to the supply and return line 7 for supplying a working fluid from the pressure source 10 to the working chamber 5 in the hydraulic cylinder 1 via the supply and return line 7. A return passage or line 11 is connected at one end thereof to a fluid tank 12 and at the other end to the supply and return line 7 for returning the working fluid from the fluid tank 12 via the supply and return line 7.

The control apparatus includes a first solenoid operated valve 13 disposed in the supply line 9, the valve 13 comprising a normally closed directional control valve with two ports and two distinct positions. The solenoid operated valve 13 is normally closed to interrupt the flow in the supply line 9 and is adapted to open the supply line 9 when an exciting current is applied to an electromagnet of the solenoid operated valve 13 ("ON" condition). When the exciting current is ceased ("OFF" condition), the valve 13 returns to its closed position.

A second solenoid operated valve 14 of the controlling apparatus is disposed in the supply line 9 downstream of the first solenoid operated valve 13.

The second solenoid operated valve 14 comprises a proportional pressure control valve adapted to regulate the differential pressure between opposite sides (an upstream side and a downstream side) of the valve 14, in proportion to the magnitude of the exciting voltage or current applied to an electromagnet of the valve 14. When the exciting current is not applied to the electromagnet ("OFF" condition), a valve body is subjected only to an internal biasing spring force which determines a preset valve opening pressure. In this instance, the reliefing pressure is equal to the preset valve opening pressure and hence the pressure difference between the opposite sides of the valve 14 becomes minimal. When an exciting current is applied to the electromagnet, an additional biasing force is exerted on the valve body. Such an additional biasing force increases as the magnitude of the exciting voltage or current on the electromagnet is increased. In proportion thereto, the reliefing pressure becomes higher to thereby increase the pressure difference between the opposite sides of the valve 14. The reliefing pressure and hence the pressure difference is a maximum when a maximum exciting voltage or current is applied to the electromagnet ("ON" condition). The maximum reliefing pressure is substantially higher than the pressure in the working chamber 5 which is produced in response to the pulling force F of the clutch C acting in the direction of the arrow A. The valve 14 seemingly fully blocks the line or passage thereof upon such maximum exitation of the electromagnet.

The controlling apparatus further includes a third solenoid operated valve 15 disposed in the return line 11. The valve 15 is comprised of a proportional pressure control valve which is structurally and functionally the same as the second solenoid operated valve 14, and a detailed description thereof is not necessary.

The second and third solenoid operated valves 14, 15 may be constituted by a pressure control valve with a ball valve which is disclosed by the present assignee in the Japanese Patent Laid-open Publication No. 56-42772.

The controlling apparatus also includes a control unit 16 comprised of a microcomputer, for example. The control unit 16 is adapted to receive a position signal Lc from the position detector 8 and a command signal from a command signal generator 17, then to obtain a control signal based on the input signals through computing and amplifying operations, and to deliver the control signal to the first to third solenoid operated valves 13-14 for controlling the latter. The command signal generator 17 is disposed on a shift lever, for example.

Figure 2:
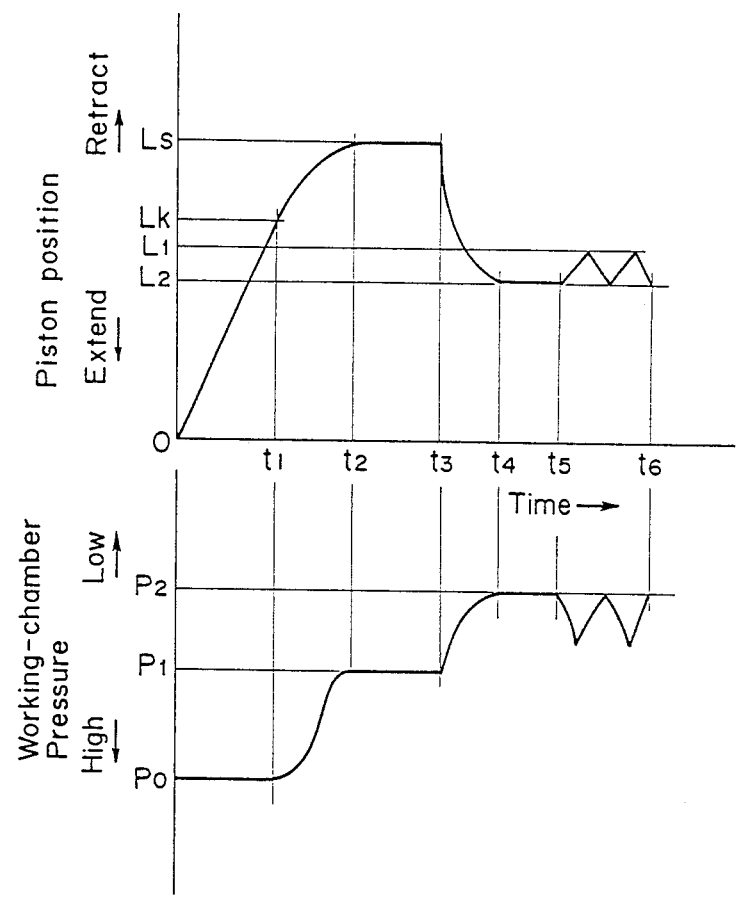
FIG. 2 is a time-chart explanative of the operation of the controlling apparatus.
Figure 3:
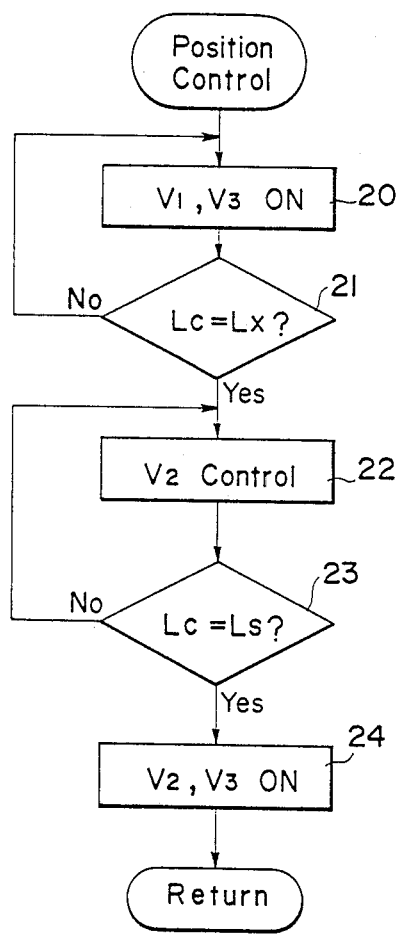
FIG. 3 is a flowchart illustrative of a position control routine for a microcomputer in the controlling apparatus.
Figure 4:
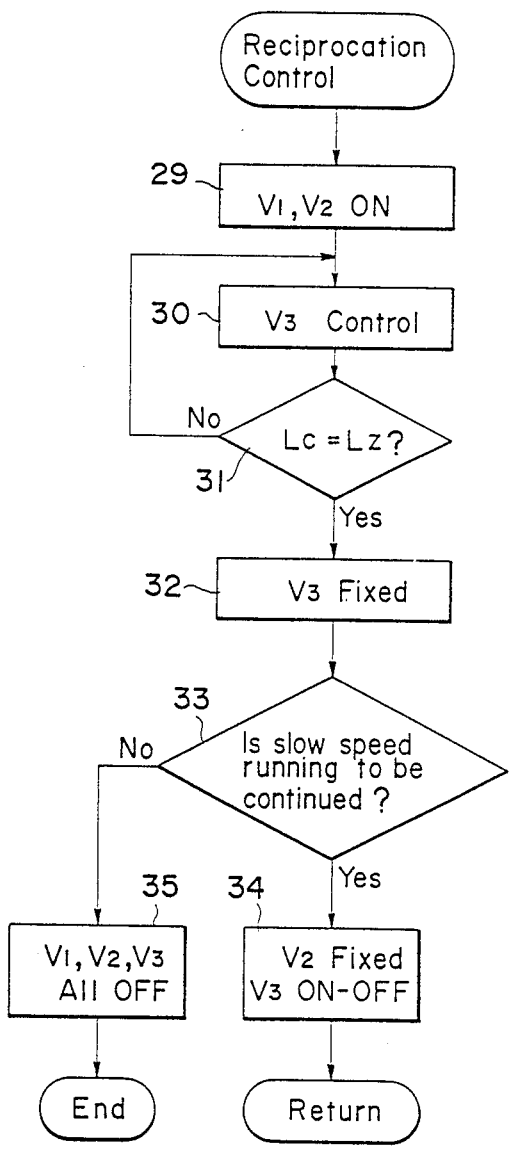
FIG. 4 is a flowchart illustrative of a reciprocation control routine for the microcomputer.

The operation of the control unit 16 is described hereinbelow in detail with reference to FIGS. 2-4. The control unit 16 has a position control function to control the position of the piston 3, and a reciprocation control function to reciprocate the piston 3 within a predetermined part of its stroke. In FIGS. 3 and 4, the first, second and third solenoid operated valves 13, 14, 15 are designated by V1, V2 and V3, respectively.

The position control function of the control unit 16 is first described. As shown in FIG. 3, at the first step 20, the first solenoid operated valve 13 (V1) and the second solenoid operated valve 14 (V2) are actuated to "ON". At the next step 21, it is determined as to whether or not the piston 3 assumes a position Lk slightly short of a desired objective position Ls (by the computing operations based on the equation: $Lk=Ls-\Delta L$). If the foregoing condition is not satisfied, the procedure is returned to the step 20. The foregoing sequence of operations are repeated until Lc becoxes equal to Lk. In this instance, the fluid pressure in the supply passage 9 becomes maximum at a downstream side of the second solenoid operated valve 14. At the same time, the return line 15 is choked or restricted to a maximum extent by the third solenoid operated valve 15 whereupon the pressure in the working chamber 5 increases to cause the piston 3 to suddenly move, against the spring force of the clutch C, in the direction to retract the piston rod 4 from the initial position 0 to the position Lk (corresponding to a period of time between 0 and t1 of FIG. 2).

Then the operation proceeds to the step 22 where excitation of the second solenoid operated valve 14 (V2) is commenced while maintaining the first and second solenoid operated valves 13, 14 in "ON" conditions. At the subsequent step 23, it is determined as to whether or not the piston 3 has assumed the objective position Ls. If the piston 3 has not reached the position Ls, the procedure is returned to the step 22 and the foregoing sequence of operations are repeated until the position Lc of the piston becomes equal to the objective position Ls. Control of the second solenoid operated valve 14 during the step 22 proceeds in such a manner that the magnitude of exciting voltage or current is increased gradually by adding a constant increment to the preceding value for each repetition. With a gradual increase in the exciting voltage or current, the second solenoid operated valve 14 gradually restricts the passage therein to thereby gradually reduce the pressure in the working chamber 5 from the value P0 to P1. The speed of the piston 3 is therefore reduced gradually as the piston approaches the objective position Ls (a period of time between t1 and t2 of FIG. 2).

When the piston 3 reaches the objective position Ls, the procedure progresses to the subsequent step 24. The second and third solenoid actuated valves 14, 15 (V2, V3) are actuated to "ON", whereupon the pressure in the working chamber 5 of the cylinder 1 becomes equal to the value P1 with the result that the piston 3 is stopped under balanced pressure in the cylinder 1 (a period of time between t2 and t3).

The foregoing position control is employed to disengage the clutch when shifting the transmission gears in the automoble power transmission. With this control, the piston 3 can be accurately stopped at the desired position so that unneccesary movement of the piston 3 is avoidable before the next shifting operation. As a result, the neccessary shifting time is substantially reduced.

The reciprocation control is started while the first solenoid operated valve 13 (V1) is kept in its "ON" condition. As shown in FIG. 4, at the first step 29, the first and second solenoid operated valves 13, 14 (V1, V2) are actuated to "ON". Then the third solenoid operated valve 15 (V3) is controlled according to the subsequent step 30. At the next following step 31, determination is made as to whether or not the position of the piston 3 assumes a predetermined position L2 or not. If not, the procedure is returned to the preceding step 30 which is in turn repeated until the position Lc of the piston 3 becomes equal to the value corresponding to position L2. The control of the third solenoid operated valve 15 at the step 30 is achieved in such a manner that the magnitude of the exciting voltage or current is greatly reduced at the initial stage and is gradually increased as the piston 3 approaches the desired position. With this arrangement, the piston 3 approaches the position L2 while gradually reducing its speed of movement (a period of time between t3 and t4).

When the piston 3 arrives at the position L2, the operation proceeds to the step 32 where the amount of excitation voltage or current on the third solenoid operated valve 15 (Vs) is maintained at a fixed value. Accordingly, the pressure in the working chamber 5 is kept at the value P2, whereupon the clutch is maintained in a certain partially engaged or half-clutched condition (a period of time between t4 and t5), thereby enabling an automotive vehicle to run at a slow speed. The procudure is advanced to the following step 33 by a vehicle running signal. At this step, a decision is made as to whether or not the low speed running is to be continued. If the low speed running is to be continued, the next following step 34 is started. In this step 34 an ON-OFF control of the excitation of the second solenoid operated valve 14 (V2) is achieved at a predetermined cycle. The ON-OFF cycle varies with the vehicle running signal so that the pressure in the working chamber 5 also varies, thereby causing the piston 3 to reciprocate within a predetermined distance between L1 and L2, for instance (a period of time between t5 and t6). The reciprocating speed of the piston in a piston-rod retracting direction corresponds to the amount of fluid which is obtained by subtracting the amount of relief through the third solenoid operated valve 15, from the amount of supply when the second solenoid operated valve 14 is maintained in its "OFF" condition. In the piston-rod extending direction, the reciprocating speed is determined by a rate of displacement of the working fluid from the working chamber 5 before the relieving pressure of the third solenoid operated valve 15 becomes equal to the preset value with the aid of the spring force of the clutch C. The cycle of reciprocation of the piston 3 corresponds to the ON-OFF cycle of the third solenoid operated valve 15.

When a decision is made at the step 33 to discontinue the slow speed running, all the solenoid operated valves 13-15 are de-energized to end the reciproction control operations.

The above-mentioned reciprocation control is used to maintain the clutch in a partly engaged or half-clutched condition for enabling the vehicle to move at a low speed which is required when garaging the vehicle, for instance. With this control, the half-clutched mode of operation and the fully disengaged mode of operation can be repeated so that it is possible to reduce abrasive wear of the clutch plate which would otherwise be accelerated when the clutch is maintained in the half-clutched condition for a long period of time. During the aforesaid repetition, the vehicle speed can be properly controlled by exciting the second and third solenoid operated valves 14, 15.

Obviously, many modifications and variations of the present invention are possible in light of the above teachings. It is therefore to be understood that within the scope of the appended claims, the invention may be practiced otherwise than as specifically described.

What is claimed is:

1. An apparatus for controlling a piston continuously subjected to a constant unidirectional force within a hydraulic cylinder, said apparatus comprising:
   a first solenoid operated valve disposed in a supply line through which working fluid is supplied from a hydraulic pressure source to a working chamber defined in the hydraulic cylinder by the piston, said first solenoid operated valve movable between a first position to open said supply line and a second position to close the supply line;
   a second solenoid operated valve comprising a proportional pressure control valve disposed in said supply line for regulating the pressure of fluid in said supply line;
   a third solenoid operated valve disposed in a return line through which working fluid is returned from the working chamber to a hydraulic tank, said third solenoid operated valve comprising a proportional pressure control valve for regulating the pressure of fluid in said return line;
   a control unit operatively connected to said first solenoid operated valve for moving said first solenoid valve between said first and said second positions, the control unit operatively connected to said second and said third solenoid operated valves for inputting a variable exciting current to the solenoid of the second and the third solenoid operated valves respectively which causes the second and the third solenoid operated valves to restrict the supply line and the return line respectively in proportional amounts over a range of values corresponding to the magnitude of the exciting current input thereto thereby controlling the piston speed.

2. An apparatus as claimed in claim 1, wherein said control unit includes position control means for controlling said valves to move the piston to a desired position within the hydraulic cylinder and for inputting an exciting current to the solenoid of said second solenoid operated valve that increases as the piston approaches the desired position to progressively reduce the speed of movement of the piston as the piston approaches the desired position.

3. An apparatus as claimed in claim 1, wherein said control unit includes reciprocation control means for reciprocating the piston at a predetermined maximum stroke and for inputting exciting current to the solenoid of the third solenoid valve to stop the piston at a desired position within the hydraulic cylinder and for subsequently inputting a varying exciting current to the solenoid of the second solenoid operated valve for controlling the second solenoid operated valve in an on-off mode to reciprocate the piston at a stroke that is within and less than said predetermined maximum stroke.

4. An apparatus as claimed in claim 2, wherein said control unit further includes reciprocation control means for reciprocating the piston at a predetermined maximum stroke and for inputting exciting current to the solenoid of the third solenoid valve to stop the piston at a second desired position within the hydraulic cylinder and for subsequently inputting a varying exciting current to the solenoid of the second solenoid operated valve for controlling the second solenoid operated valve in an off-mode to reciprocate the piston at a stroke that is within and less than said predetermined maximum stroke.

* * * * *